UNITED STATES PATENT OFFICE.

FRITZ HOFMANN AND CARL COUTELLE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING BETA-METHYLADIPIC ACID.

991,719.   Specification of Letters Patent.   Patented May 9, 1911.

No Drawing.   Application filed November 23, 1909. Serial No. 529,544.

*To all whom it may concern:*

Be it known that we, FRITZ HOFMANN and CARL COUTELLE, doctors of philosophy, chemists, citizens of the German Empire, residing at Elberfeld, Germany, have invented new and useful Improvements in Processes of Producing Beta-Methlyadipic Acid, of which the following is a specification.

Our invention relates to a new and valuable process for producing beta-methyladipic acid which is a valuable intermediate compound for producing other products of technical importance.

The new process consists in treating para-methyl-cyclohexanol:

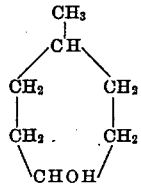

with oxidizing agents, such as $HNO_3$, $KMnO_4$, $K_2Cr_2O_7$.

In order to illustrate the new process more fully we can proceed as follows, the parts being by weight: A solution of 22.5 parts of $KMnO_4$ in 420 parts of water is slowly added to a suspension of 5 parts of para-methyl-cyclohexanol in a solution of 10 parts of crystallized sodium carbonate in 83 parts of water. The mixture is filtered, the filtrate is evaporated to 40 parts and 10 parts of concentrated HCl are added. The beta-methyladipic acid separates. It can be purified by a recrystallization from benzene.

The formation of the product takes probably place according to the following formula:

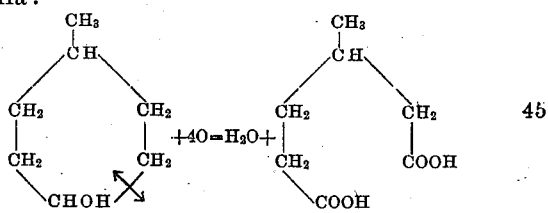

Methyladipic acid is mainly used in synthetic chemistry for the production of pharmaceutical products, colors, terpenes and other technical substances. Other oxidizing agents can be used.

We claim:—

1. The process for producing beta-methyladipic acid, which process consists in treating para-methylcyclohexanol with oxidizing agents, substantially as described.

2. The process for producing beta-methyladipic acid, which process consists in treating para-methylcyclohexanol with permanganate of potassium, substantially as described.

In testimony whereof we have hereunto set our hands in the presence of two subscribing witnesses.

FRITZ HOFMANN. [L. S.]
CARL COUTELLE. [L. S.]

Witnesses:
OTTO KÖNIG,
CHAS. J. WRIGHT.